(12) United States Patent
Izadian et al.

(10) Patent No.: US 9,876,282 B1
(45) Date of Patent: Jan. 23, 2018

(54) INTEGRATED LENS FOR POWER AND PHASE SETTING OF DOEWG ANTENNA ARRAYS

(71) Applicant: Waymo LLC, Mountain View, CA (US)

(72) Inventors: Jamal Izadian, San Jose, CA (US); Russell Smith, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 230 days.

(21) Appl. No.: 14/677,004

(22) Filed: Apr. 2, 2015

(51) Int. Cl.
| | |
|---|---|
| *H01Q 13/06* | (2006.01) |
| *H01Q 7/02* | (2006.01) |
| *H01Q 21/00* | (2006.01) |
| *G01S 7/02* | (2006.01) |

(52) U.S. Cl.
CPC ......... *H01Q 13/06* (2013.01); *H01Q 21/0037* (2013.01); *G01S 7/02* (2013.01)

(58) Field of Classification Search
CPC .... H01Q 13/06; H01Q 21/0037; H01Q 3/443; H01Q 1/38; H01Q 21/005; H01Q 19/10; H01Q 13/02; H01Q 21/0075; H01Q 21/064; H01Q 21/0006; H01Q 21/0087; G01S 7/032; G01S 13/02; H01P 3/12; H01P 3/123
USPC ................ 342/385; 343/772, 776, 780, 792, 343/793–823
See application file for complete search history.

(56) References Cited

U.S. PATENT DOCUMENTS

| | | | | |
|---|---|---|---|---|
| 2,704,327 | A | * | 3/1955 | Chandler ............... H01Q 3/443 333/157 |
| 3,696,433 | A | | 10/1972 | Killion |
| 4,298,878 | A | * | 11/1981 | Dupressoir .............. H01Q 1/38 342/371 |
| 5,565,878 | A | | 10/1996 | Lagerlof |
| 5,596,336 | A | | 1/1997 | Liu |
| 5,929,728 | A | | 7/1999 | Barnett et al. |

(Continued)

OTHER PUBLICATIONS

D. Parker et al., Phased Arrays—Part I: Theory and Architectures, IEEE Transactions on Microwave Theory and Techniques, vol. 5(3), p. 678-687, Mar. 2002.*

*Primary Examiner* — Bernarr E Gregory
*Assistant Examiner* — Fred H Mull
(74) *Attorney, Agent, or Firm* — McDonnell Boehnen Hulbert & Berghoff LLP (57) ABSTRACT

The present application discloses a dual open-ended waveguide (DOEWG) antenna apparatus. The apparatus may include a plurality of radiating elements configured to radiate electromagnetic energy. Each radiating element may have an associated amplitude and phase. The apparatus may further include a waveguide configured to propagate an electromagnetic signal from a waveguide feed to the radiating elements. The radiating elements are arranged in a plurality of doublets. Each doublet includes at least two radiating elements and is coupled to the waveguide via a respective doublet neck. At least one doublet in the plurality of doublets is coupled to the waveguide via a doublet neck that has a first height proximate a first radiating element in the at least one doublet and a second height proximate a second radiating element in the at least one doublet in which the first height is different from the second height.

14 Claims, 8 Drawing Sheets

(56) References Cited

U.S. PATENT DOCUMENTS

| | | |
|---|---|---|
| 6,182,354 B1 | 2/2001 | Kronz |
| 6,232,910 B1 | 5/2001 | Bell et al. |
| 6,243,024 B1 | 6/2001 | Yamabuchi et al. |
| 6,297,782 B1 | 10/2001 | Matthews |
| 6,563,398 B1 | 5/2003 | Wu |
| 6,642,908 B2 | 11/2003 | Pleva et al. |
| 6,777,684 B1 | 8/2004 | Volkov et al. |
| 6,861,996 B2 | 3/2005 | Jeong |
| 7,202,832 B2 | 4/2007 | Wang |
| 7,394,335 B2 | 7/2008 | Chang et al. |
| 7,423,604 B2 | 9/2008 | Nagai |
| 7,450,072 B2 | 11/2008 | Kim |
| 7,575,703 B2 | 8/2009 | Herting et al. |
| 7,576,703 B1 * | 8/2009 | Herting .............. H01Q 21/0006 343/771 |
| 7,783,403 B2 | 8/2010 | Breed |
| 7,847,749 B2 | 12/2010 | Haziza |
| 7,928,919 B2 | 4/2011 | Margomenos |
| 8,013,694 B2 | 9/2011 | Hiramatsu |
| 8,134,427 B2 | 3/2012 | Fujita |
| 8,587,492 B2 | 11/2013 | Runyon |
| 8,922,425 B2 * | 12/2014 | Hayata ...................... H01P 3/12 342/175 |
| 9,472,853 B1 * | 10/2016 | Smith .................... H01Q 13/02 |
| 2005/0225481 A1 | 10/2005 | Bonthron |
| 2006/0164315 A1 * | 7/2006 | Munk .................. H01Q 21/005 343/776 |
| 2007/0013598 A1 | 1/2007 | Artis et al. |
| 2007/0139287 A1 * | 6/2007 | Inomata .................. G01S 7/032 343/786 |
| 2009/0121952 A1 | 5/2009 | Shibuya et al. |
| 2009/0300901 A1 | 12/2009 | Artis et al. |
| 2009/0315796 A1 * | 12/2009 | Kodama .................. H01P 3/12 343/772 |
| 2010/0060537 A1 * | 3/2010 | Nagayama ........... H01Q 21/064 343/776 |
| 2010/0085263 A1 | 4/2010 | Yano |
| 2010/0238085 A1 * | 9/2010 | Fuh .................... H01Q 21/0087 343/771 |
| 2011/0187614 A1 * | 8/2011 | Kirino ..................... G01S 7/032 343/713 |
| 2011/0291874 A1 | 12/2011 | De Mersseman |
| 2012/0068900 A1 | 3/2012 | Yatabe et al. |
| 2012/0092224 A1 | 4/2012 | Sauleau et al. |
| 2013/0120205 A1 * | 5/2013 | Thomson ........... H01Q 21/0075 343/776 |
| 2013/0120206 A1 * | 5/2013 | Biancotto ............ H01Q 21/005 343/776 |
| 2013/0141186 A1 | 6/2013 | Nguyen et al. |
| 2013/0321229 A1 | 8/2013 | Klefenz et al. |
| 2013/0236189 A1 | 9/2013 | Yamamoto et al. |
| 2014/0055312 A1 * | 2/2014 | Guler .................... H01Q 13/02 343/785 |

* cited by examiner

INTEGRATED LENS FOR POWER AND PHASE SETTING OF DOEWG ANTENNA ARRAYS

BACKGROUND

Unless otherwise indicated herein, the materials described in this section are not prior art to the claims in this application and are not admitted to be prior art by inclusion in this section.

Radio detection and ranging (RADAR) systems can be used to actively estimate distances to environmental features by emitting radio signals and detecting returning reflected signals. Distances to radio-reflective features can be determined according to the time delay between transmission and reception. The radar system can emit a signal that varies in frequency over time, such as a signal with a time-varying frequency ramp, and then relate the difference in frequency between the emitted signal and the reflected signal to a range estimate. Some systems may also estimate relative motion of reflective objects based on Doppler frequency shifts in the received reflected signals. Directional antennas can be used for the transmission and/or reception of signals to associate each range estimate with a bearing. More generally, directional antennas can also be used to focus radiated energy on a given field of view of interest. Combining the measured distances and the directional information allows for the surrounding environment features to be mapped. The radar sensor can thus be used, for instance, by an autonomous vehicle control system to avoid obstacles indicated by the sensor information.

Some example automotive radar systems may be configured to operate at an electromagnetic wave frequency of 77 Giga-Hertz (GHz), which corresponds to millimeter (mm) electromagnetic wave length (e.g., 3.9 mm for 77 GHz). These radar systems may use antennas that can focus the radiated energy into tight beams in order to enable the radar system to measure an environment with high accuracy, such as an environment around an autonomous vehicle. Such antennas may be compact (typically with rectangular form factors; e.g., 1.3 inches high by 2.5 inches wide), efficient (i.e., there should be little 77 GHz energy lost to heat in the antenna, or reflected back into the transmitter electronics), and cheap and easy to manufacture.

In some scenarios, efficiency may be difficult to balance with cheap and easy manufacture. Some cheap and easy to manufacture options may involve integrating an antenna into a circuit board (e.g., with a "series-fed patch array"), which is used by many off-the-shelf automotive radars. However, such antennas may lose much of their energy into heating up the substrate of the circuit board. Antennas with the lowest loss may include all-metal designs, but typical all-metal antennas, such as slotted waveguide arrays, can be difficult to manufacture with the small geometries compatible with 77 GHz operation.

SUMMARY

The present application discloses embodiments that relate to a dual open-ended waveguide (DOEWG) antenna. In one aspect, the present application describes an apparatus for a DOEWG antenna. The apparatus may include a plurality of radiating elements configured to radiate electromagnetic energy. Each radiating element of the plurality of radiating elements may have an associated amplitude and phase. The apparatus may further include a waveguide configured to propagate an electromagnetic signal from a waveguide feed to the plurality of radiating elements. The plurality of radiating elements is arranged in a plurality of doublets. Each doublet includes at least two radiating elements and is coupled to the waveguide via a respective doublet neck. At least one doublet in the plurality of doublets is coupled to the waveguide via a doublet neck that has a first height proximate a first radiating element in the at least one doublet and a second height proximate a second radiating element in the at least one doublet in which the first height is different from the second height. Additionally, the apparatus includes the at least one doublet having a corresponding reflecting component in the waveguide.

In another aspect, the present application describes a method. The method may involve propagating electromagnetic energy from a waveguide feed to the plurality of radiating elements. The method may further include coupling a least a portion of the electromagnetic energy from the waveguide to each one of a plurality of doublets. Each doublet may include two radiating elements and is coupled to the waveguide via a respective doublet neck. At least one doublet in the plurality of doublets may be coupled to the waveguide via a doublet neck that has a first height proximate a first radiating element in the at least one doublet and a second height proximate a second radiating element in the at least one doublet in which the first height is different from the second height. The at least one doublet may have a corresponding reflecting component in the waveguide. And yet further, the method may include radiating a least a portion of the coupled electromagnetic energy via each radiating element in the plurality of radiating doublets. Each radiating element has an associated amplitude and phase.

In yet another aspect, the present application describes an apparatus. The apparatus may include a waveguide layer configured to propagate electromagnetic energy via a waveguide. The waveguide layer may include at least one reflecting component. The apparatus may also include a radiating layer coupled to the waveguide layer. The radiating layer may be parallel to a height dimension of the waveguide. The radiating layer may be configured to include a linear array of radiating elements. The array includes a plurality of radiating elements configured to radiate electromagnetic energy. Each radiating element of the plurality of radiating elements may have an associated amplitude and phase. The plurality of radiating elements may be arranged in a plurality of doublets. Each doublet may include two radiating elements and is coupled to the waveguide via a respective doublet neck. At least one doublet in the plurality of doublets is coupled to the waveguide via a doublet neck that has a first height proximate a first radiating element in the at least one doublet and a second height proximate a second radiating element in the at least one doublet in which the first height is different from the second height. Additionally, the apparatus may include the at least one doublet has a corresponding reflecting component in the waveguide.

In still another aspect, a system is provided that includes a means for propagating electromagnetic energy configured to propagate an electromagnetic signal from a means for feeding to the plurality of means for radiating. The system may further include means for coupling a least a portion of the electromagnetic energy from the means for propagating to a one of a plurality of means for radiating. Each means for radiating may include two means for radiating elements and is coupled to the means for radiating via a respective means for coupling. At least one means for radiating in the plurality of means for radiating may be coupled to the means for propagating via a means for coupling that has a first height proximate a first means for radiating element in the at least one means for radiating and a second height proximate a second means for radiating element in the at least one means for radiating in which the first height is different from the second height. The at least one means for radiating may have a corresponding means for reflecting in the means for propagating. And yet further, the system may include radiating a least a portion of the coupled electromagnetic energy with a means for radiating element of the means for radiating, wherein each means for radiating element has an associated amplitude and phase.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The following detailed description may disclose, inter alia, an apparatus for a "dual open-ended waveguide" (DOEWG) antenna for a radar system for an autonomous vehicle, for instance, and a method for fabricating such an antenna. In some examples, the term "DOEWG" may refer herein to a short section of a horizontal waveguide channel plus a vertical channel that splits into two parts, where each of the two parts of the vertical channel includes an output port configured to radiate at least a portion of electromagnetic waves that enter the antenna.

An example DOEWG antenna may comprise, for example, two metal layers (e.g., aluminum plates) that can be machined with computer numerical control (CNC), aligned properly, and joined together. The first metal layer may include a first half of an input waveguide channel, where the first half of the first waveguide channel includes an input port that may be configured to receive electromagnetic waves (e.g., 77 GHz millimeter waves) into the first waveguide channel. The first metal layer may also include a first half of a plurality of wave-dividing channels. The plurality of wave-dividing channels may comprise a network of channels that branch out from the input waveguide channel and that may be configured to receive the electromagnetic waves from the input waveguide channel, divide the electromagnetic waves into a plurality of portions of electromagnetic waves (i.e., power dividers), and propagate respective portions of electromagnetic waves to respective wave-radiating channels of a plurality of wave-radiating channels.

Further, the first metal layer may include a first half of the plurality of wave-radiating channels, where respective wave-radiating channels may be configured to receive the respective portions of electromagnetic waves from the wave-dividing channels, and where first halves of the respective wave-radiating channels include at least one wave-directing member configured to propagate sub-portions of electromagnetic waves to another metal layer.

Moreover, the second metal layer may include second halves of the input waveguide channel, the plurality of wave-dividing channels, and the plurality of wave-radiating channels. The second halves of the respective wave-radiating channels may include at least one pair of output ports partially aligned with the at least one wave-directing member and configured to radiate the sub-portions of electromagnetic waves propagated from the at least one wave-directing member out of the second metal layer. More particularly, a combination of a given wave-directing member with a corresponding pair of output ports may take the form of (and may be referred to herein as) a DOEWG, as described above.

While in this particular example the antenna includes multiple wave-dividing channels and multiple wave-radiating channels, in other examples the antenna may include, at a minimum, only a single channel configured to propagate all the electromagnetic waves received by the input port to one or more wave-radiating channels. For instance, all the electromagnetic waves may be radiated out of the second metal layer by a single DOEWG. Other examples are possible as well.

Furthermore, while in this particular example, as well as in other examples described herein, the antenna apparatus may be comprised of two metal layers, it should be understood that in still other examples, one or more of the channels described above may be formed into a single metal layer, or into more than two metal layers that make up the antenna. Still further, within examples herein, the concept of electromagnetic waves (or portions/sub-portions thereof) propagating from one layer of a DOEWG antenna to another layer is described for the purpose of illustrating functions of certain components of the antenna, such as the wave-directing members. In reality, electromagnetic waves may not be confined to any particular "half" of a channel during certain points of their propagation through the antenna. Rather, at these certain points, the electromagnetic waves may propagate freely through both halves of a given channel when the halves are combined to form the given channel.

In some embodiments discussed herein, the two metal layers may be joined directly, without the use of adhesives, dielectrics, or other materials, and without methods such as soldering, diffusion bonding, etc. that can be used to join two metal layers. For example, the two metal layers may be joined by making the two layers in physical contact without any further means of coupling the layers.

In some examples, the present disclosure is directed toward an integrated power divider that provides a method by which each individual radiation element in a doublet of a DOEWG may have its associated amplitude is adjusted. The amplitude may be adjusted based on a pre-defined taper profile. In another example, a method may be implemented in each DOEWG to adjust the phase of each individual radiating elements in each DOEWG doublet. The phase may be adjusted based on the present of stepped components in the respective DOEWG doublet. Additionally, the present DOEWG may be implemented without complicated manufacturing process. For example, a Computerized Numerical Control (CNC) machining process may be implemented to make the above-described adjustments in parameters such height, depth, multiplicity of step-up or step-down phase adjustment components, etc. Yet further, the present disclosure may enable a much more accurate method of synthesizing a desired amplitude and phase to cause a realized gain, sidelobe levels, and beam pointing for the antenna apparatus, as compared to other types of designs.

Specifically, this disclosure provides means to adjust the power division and phase distribution of each individual DOEWG radiation elements in the antenna that may use the same or similar manufacturing process as previous DOEWG doublet antennas. Thus, an antenna may be designed and manufactured that provides a more accurate representation of the amplitude and phases of the desired gain, sidelobe levels, and beam pointing providing a more accurate synthesis process for the DOEWG array antennas.

Figure 1:
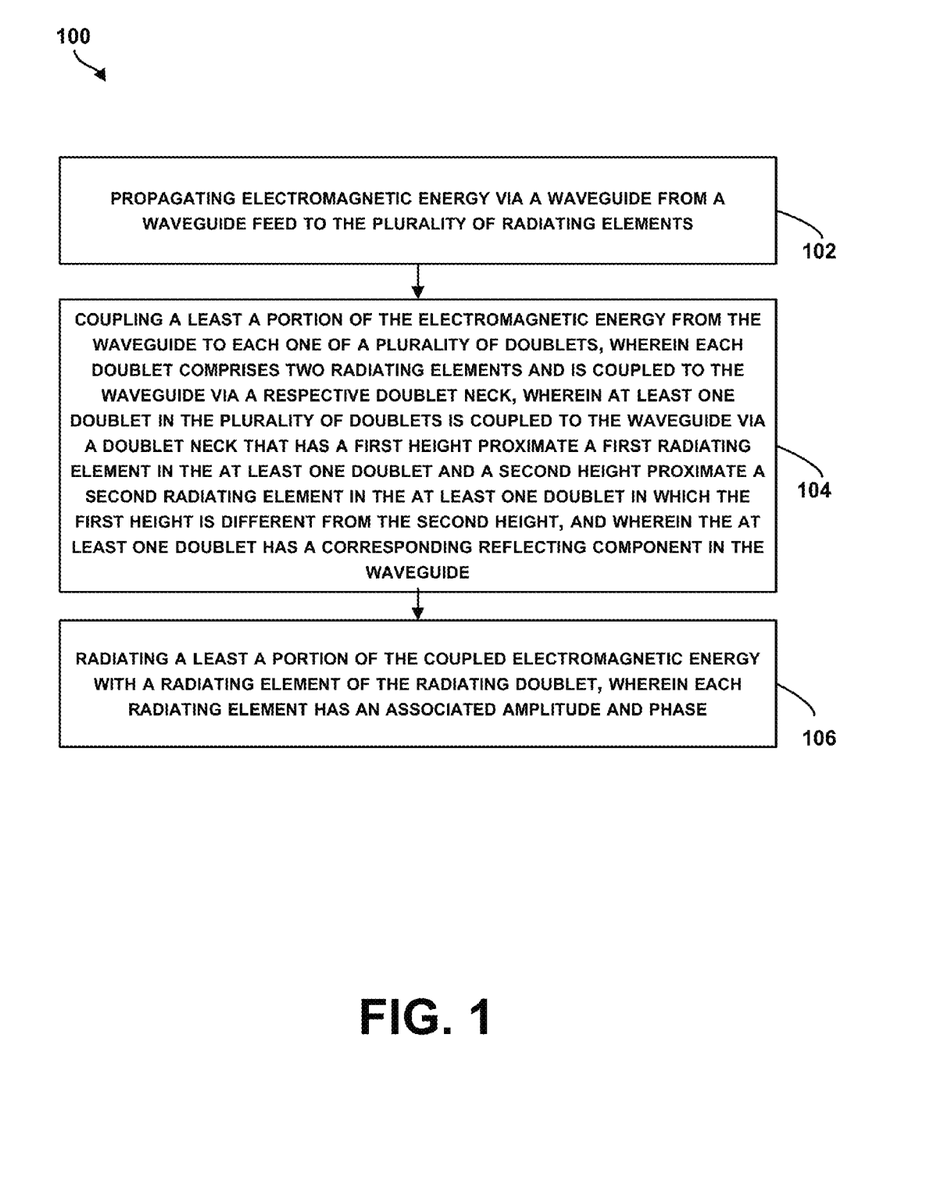
FIG. 1 is a flowchart of an example method to radiate electromagnetic energy.

Referring now to the figures, FIG. 1 is a flowchart of an example method 100 to for the operation of a DOEWG antenna with a pre-determined phase and amplitude across the plurality of antenna elements. It should be understood that other methods of operation not described herein are possible as well.

It should also be understood that a given application of such an antenna may determine appropriate dimensions and sizes for various machined portions of the two metal layers described above (e.g., channel size, metal layer thickness, etc.) and/or for other machined (or non-machined) portions/components of the antenna described herein. For instance, as discussed above, some example radar systems may be configured to operate at an electromagnetic wave frequency of 77 GHz, which corresponds to millimeter electromagnetic wave length. At this frequency, the channels, ports, etc. of an apparatus fabricated by way of method 100 may be of given dimensions appropriated for the 77 GHz frequency. Other example antennas and antenna applications are possible as well.

Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

Moreover, the method 100 of FIG. 1 will be described in conjunction with FIGS. 2A-2E.

At block 102, the method 100 includes propagating electromagnetic energy (e.g., 77 GHz millimeter electromagnetic waves) via a waveguide from a waveguide feed to the plurality of radiating elements.

At block 104, the method 100 includes coupling a least a portion of the electromagnetic energy from the waveguide to each one of a plurality of doublets, wherein each doublet comprises two radiating elements and is coupled to the waveguide via a respective doublet neck, wherein at least one doublet in the plurality of doublets is coupled to the waveguide via a doublet neck that has a first height proximate a first radiating element in the at least one doublet and a second height proximate a second radiating element in the at least one doublet in which the first height is different from the second height, and wherein the at least one doublet has a corresponding reflecting component in the waveguide.

At block 106, the method 100 includes radiating a least a portion of the coupled electromagnetic energy via each radiating element in the plurality of doublets, wherein each radiating element has an associated amplitude and phase.

Figure 2A:
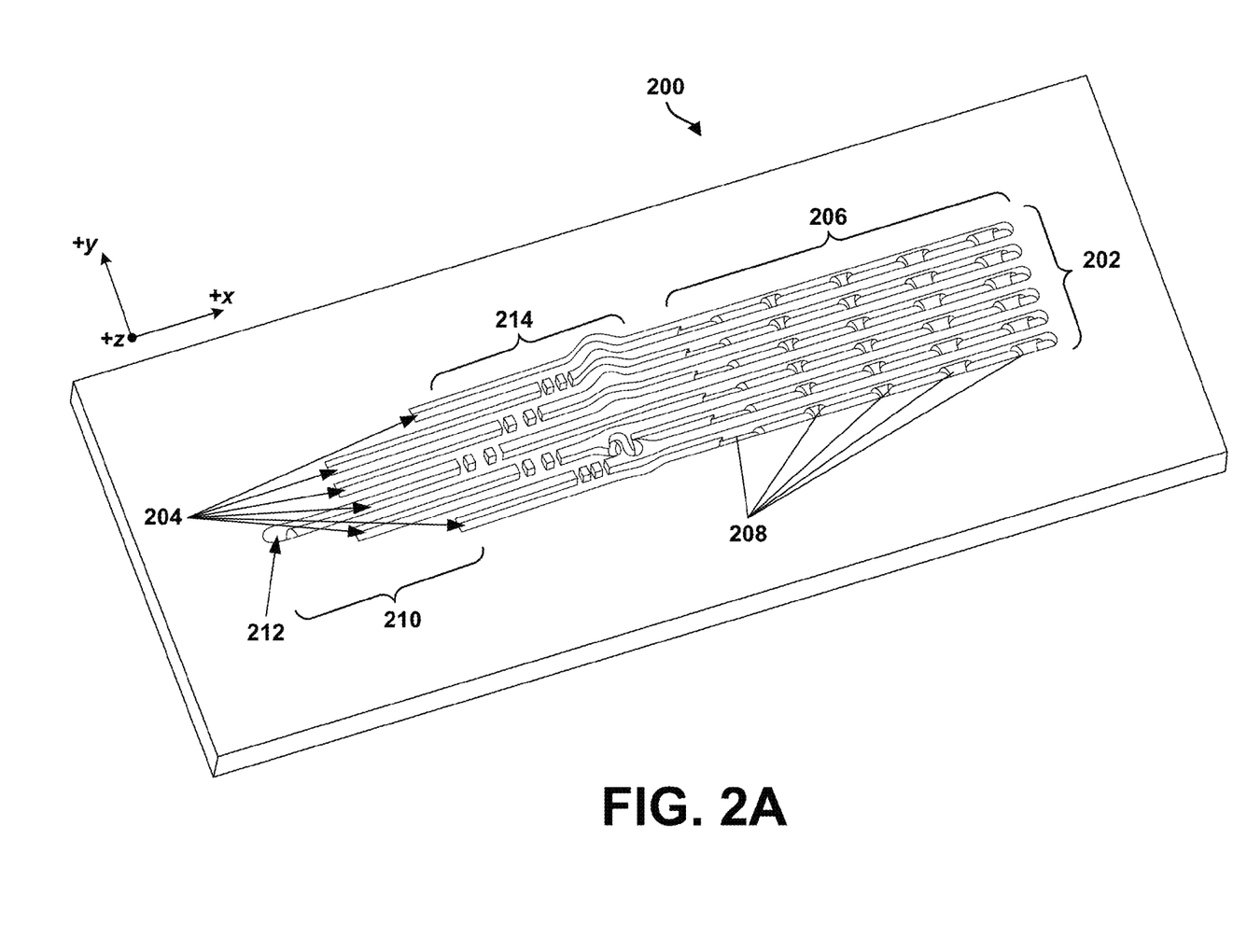
FIG. 2A illustrates a first layer of an example antenna, in accordance with an example embodiment.

FIG. 2A illustrates an example first metal layer 200 including a first half of a plurality of waveguide channels 202. These waveguide channels 202 may comprise multiple elongated segments 204. At a first end 206 of each elongated segment 204 may be a plurality of collinear wave-directing members 208, each with sizes similar or different from other wave-directing members. In line with the description above, the first ends 206 of the elongated segments 204 may be referred to herein as a first half of wave-radiating channels.

At a second end 210 of the channels 202 opposite the first end 206, one of the elongated segments 204 may include a through-hole 212 (i.e., input port). A given amount of power may be used to feed a corresponding amount of electromagnetic waves (i.e., energy) into the apparatus, and the through-hole 212 may be the location where these waves are fed into the apparatus. In line with the description above, the single channel/segment of the waveguide channels 202 that includes the input port may be referred to herein as an input waveguide channel.

Upon entering the apparatus, the electromagnetic waves may generally travel in the +x direction, as shown, towards an array of power dividers 214 (i.e., a "beam-forming network"). The array 214 may function to divide up the electromagnetic waves and propagate respective portions of the waves to respective first ends 206 of each elongated segment 204. More specifically, the waves may continue to propagate in the +x direction after leaving the array 214 toward the wave-directing members 208. In line with the description above, the array 214 section of the waveguide channels may be referred to herein as wave-dividing channels.

As the portions of the electromagnetic waves reach the wave-directing members 208 at the first end 206 of each elongated segment 204 of the waveguide channels 202, the wave-directing members 208 may propagate through respective sub-portions of the electromagnetic energy to a second half of the waveguide channels (i.e., in the +z direction, as shown). For instance, the electromagnetic energy may first reach a wave-directing member that is recessed, or machined further into the first metal layer 200 (i.e., a pocket). That recessed member may be configured to propagate a smaller fraction of the electromagnetic energy than each of the subsequent members further down the first end 206, which may be protruding members rather than recessed members. Further, each subsequent member may be configured to propagate a greater fraction of the electromagnetic waves travelling down that particular elongated segment 204 at the first end 206 than the member that came before it. As such, the member at the far end of the first end 206 may be configured to propagate the highest fraction of electromagnetic waves. Each wave-directing member 208 may take various shapes with various dimensions. In other examples, more than one member (or no members) may be recessed. Still other examples are possible as well. In addition, varying quantities of elongated segments are possible.

Figure 2B:
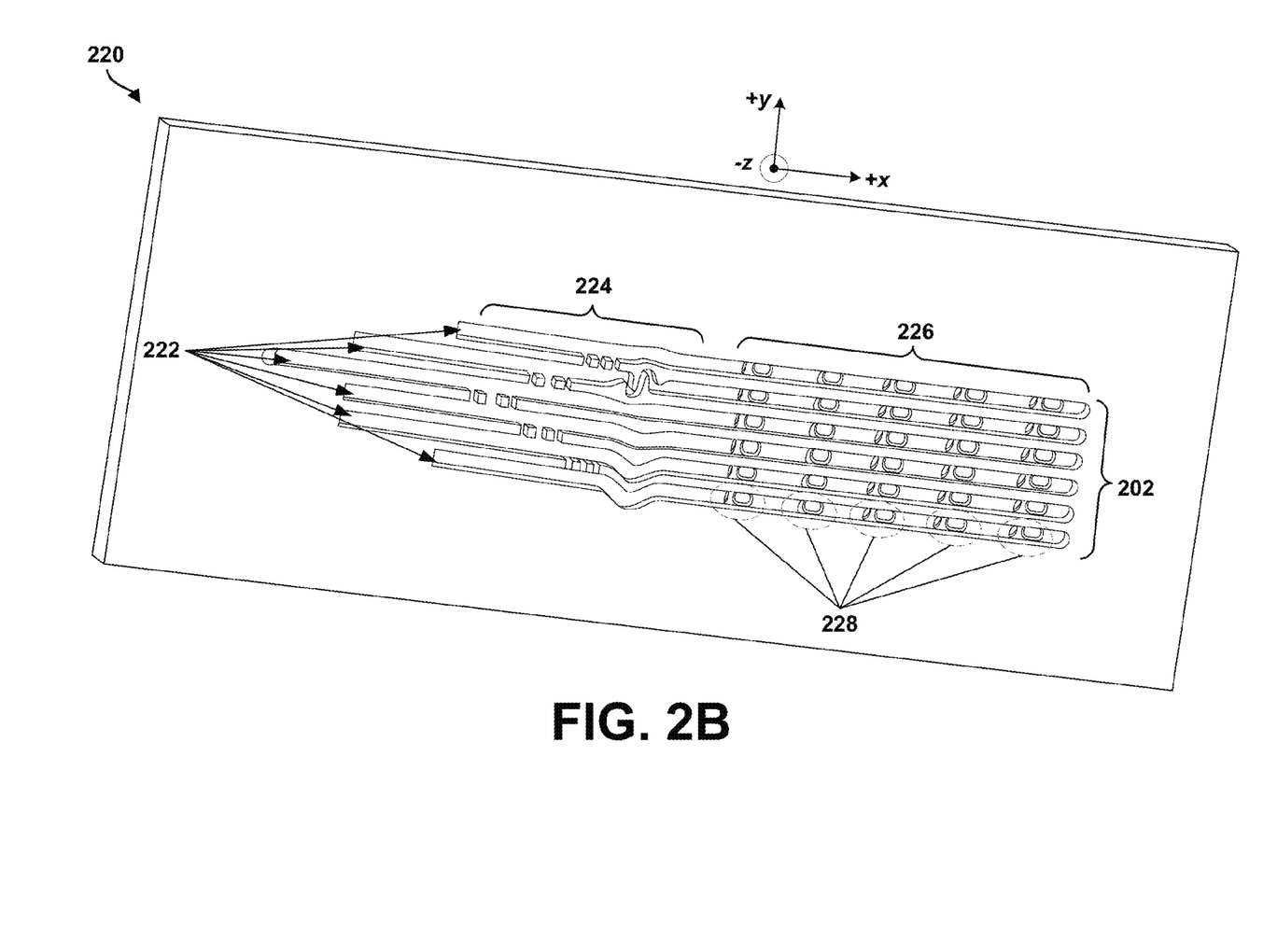
FIG. 2B illustrates a second layer of an example antenna, in accordance with an example embodiment.

A second metal layer may contain a second half of the one or more waveguide channels, where respective portions of the second half of the one or more waveguide channels include an elongated segment substantially aligned with the elongated segment of the first half of the one or more waveguide channels and, at an end of the elongated segment, at least one pair of through-holes partially aligned with the at least one wave-directing member and configured to radiate electromagnetic waves propagated from the at least one wave-directing member out of the second metal layer.

Within examples, the elongated segment of the second half may be considered to substantially align with the elongated segment of the first half when the two segments are within a threshold distance, or when centers of the segments are within a threshold distance. For instance, if the centers of the two segments are within about ±0.051 mm of each other, the segment may be considered to be substantially aligned.

In another example, when the two halves are combined (i.e., when the two metal layers are joined together), edges of the segments may be considered to be substantially aligned if an edge of the first half of a segment and a corresponding edge of the second half of the segment are within about ±0.051 mm of each other.

In still other examples, when joining the two metal layers, one layer may be angled with respect to the other layer such that their sides are not flush with one another. In such other examples, the two metal layers, and thus the two halves of the segments, may be considered to be substantially aligned when this angle offset is less than about 0.5 degrees.

In some embodiments, the at least one pair of through-holes may be perpendicular to the elongated segments of the second half of the one or more waveguide channels. Further, respective pairs of the at least one pair of through-holes may include a first portion and a second portion. As such, a given pair of through-holes may meet at the first portion to form a single channel. That single channel may be configured to receive at least the portion of electromagnetic waves that was propagated by a corresponding wave-directing member and propagate at least a portion of electromagnetic waves to the second portion. Still further, the second portion may include two output ports configured as a doublet and may be configured to receive at least the portion of electromagnetic waves from the first portion of the pair of through-holes and propagate at least that portion of electromagnetic waves out of the two output ports.

FIG. 2B illustrates the second metal layer 220 described above. The second metal layer 220 may include a second half of the plurality of waveguide channels 202 of the first metal layer 200 shown in FIG. 2A (i.e., a second half of the input waveguide channel, the wave-dividing channels, and the wave-radiating channels). As shown, the second half of the waveguide channels 202 may take on the general form of the first half of the channels, so as to facilitate proper alignment of the two halves of the channels. The elongated segments of the second half 222 may include second halves of the array of power dividers 224. As described above, electromagnetic waves may travel through the array 224, where they are divided into portions, and the portions then travel (i.e., in the +x direction, as shown) to respective ends 226 of the second halves of the elongated segments 222. Further, an end 226 of a given elongated segment may include multiple pairs of through-holes 228, which may be at least partially aligned with the wave-directing members 208 of the first metal layer 200. More specifically, each pair of through-holes may be at least partially aligned with a corresponding wave-directing member, also referred to as a reflecting element, such that when a given sub-portion of electromagnetic waves are propagated from the first metal layer 200 to the second metal layer 220, as described above, those sub-portions are then radiated out of the pair of through-holes (i.e., a pair of output ports) in the −z direction, as shown. Again, the combination of a given wave-directing member and a corresponding pair of output ports may form a DOEWG, as described above.

Moreover, a combination of all the DOEWGs may be referred to herein as a DOEWG array. In antenna theory, when an antenna has a larger radiating aperture (i.e., how much surface area of the antenna radiates, where the surface area includes the DOEWG array) that antenna may have higher gain (dB) and a narrower beam width. As such, in some embodiments, a higher-gain antenna may include more channels (i.e., elongated segments), with more DOEWGs per channel. While the example antenna illustrated in FIGS. 2A and 2B may be suitable for autonomous-vehicle purposes (e.g., six elongated segments, with five DOEWGs per segment), other embodiments may be possible as well, and such other embodiments may be designed/machined for various applications, including, but not limited to, automotive radar.

For instance, in such other embodiments, an antenna may include a minimum of a single DOEWG. With this arrangement, the output ports may radiate energy in all directions (i.e. low gain, wide beam width). Generally, an upper limit of segments/DOEWGs may be determined by a type of metal used for the first and second metal layers. For example, metal that has a high resistance may attenuate an electromagnetic wave as that wave travels down a waveguide channel. As such, when a larger, highly-resistive antenna is designed (e.g., more channels, more segments, more DOEWGs, etc.), energy that is injected into the antenna via the input port may be attenuated to an extent where not much energy is radiated out of the antenna. Therefore, in order to design a larger antenna, less resistive (and more conductive) metals may be used for the first and second metal layers. For instance, in embodiments described herein, at least one of the first and second metal layers may be aluminum. Further, in other embodiments, at least one of the first and second metal layers may be copper, silver, or another conductive material. Further, aluminum metal layers may be plated with copper, silver, or other low-resistance/high-conductivity materials to increase antenna performance. Other examples are possible as well.

The antenna may include at least one fastener configured to join the first metal layer to the second metal layer so as to align the first half of the one or more waveguide channels with the second half of the one or more waveguide channels to form the one or more waveguide channels (i.e., align the first half of the plurality of wave-dividing channels with the second half of the plurality of wave-dividing channels, and align the first half of the plurality of wave-radiating channels with the second half of the plurality of wave-radiating channels). To facilitate this in some embodiments, the first metal layer, a first plurality of through-holes (not shown in FIG. 2A) may be configured to house the at least one fastener. Additionally, in the second metal layer, a second plurality of through-holes (not shown in FIG. 2B) may be substantially aligned with the first plurality of through-holes and configured to house the at least one fastener for joining the second metal layer to the first metal layer. In such embodiments, the at least one fastener may be provided into the aligned first and second pluralities of through-holes and secured in a manner such that the two metal layers are joined together.

In some examples, the at least one fastener may be multiple fasteners. Mechanical fasteners (and technology used to facilitate fastening) such as screws and alignment pins may be used to join (e.g., screw) the two metal layers together. Further, in some examples, the two metal layers may be joined directly to each other, with no adhesive layer in between. Still further, the two metal layers may be joined together using methods different than adhesion, diffusion bonding, soldering, brazing, and the like. However, it is possible that, in other examples, such methods may be used in addition to or alternative to any methods for joining metal layers that are known or not yet known.

In some embodiments, one or more blind-holes may be formed into the first metal layer and/or into the second metal layer in addition to or alternative to the plurality of through-holes of the first and/or the second metal layer. In such embodiments, the one or more blind-holes may be used for fastening (e.g., housing screws or alignment pins) or may be used for other purposes.

Figure 2C:
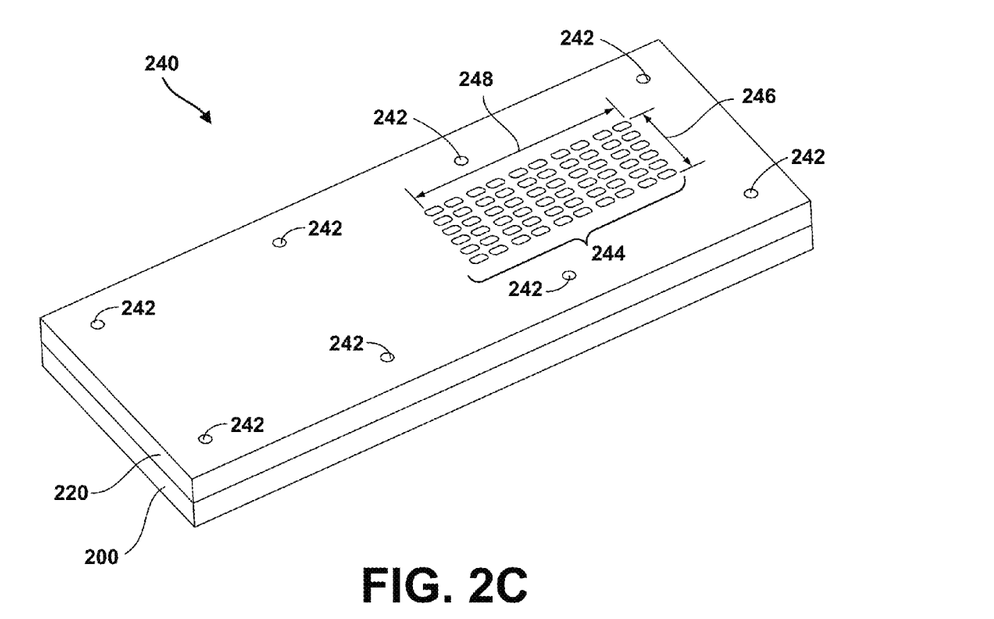
FIG. 2C illustrates an assembled views of an example antenna, in accordance with an example embodiment

FIG. 2C illustrates an assembled view of an example antenna 240. The example antenna 240 may include the first metal layer 200 and the second metal layer 220. The second metal layer 220 may include a plurality of holes 242 (through-holes and/or blind-holes) configured to house alignment pins, screws, and the like. The first metal layer 200 may include a plurality of holes as well (not shown) that are aligned with the holes 242 of the second metal layer 220.

Further, FIG. 2C illustrates a DOEWG array 244 of a given width 246 and a given length 248, which may vary based on the number of DOEWGs and channels of the antenna 240. For instance, in an example embodiment, the DOEWG array may have a width of about 11.43 mm and a length of about 28.24 mm. Further, in such an example embodiment, these dimensions, in addition to or alternative to other dimensions of the example antenna 240, may be machined with no less than about a 0.51 mm error, though in other embodiments, more or less of an error may be required. Other dimensions of the DOEWG array are possible as well.

In some embodiments, the first and second metal layers 200, 220 may be machined from aluminum plates (e.g., about 6.35 mm stock). In such embodiments, the first metal layer 200 may be at least 3 mm in thickness (e.g., about 5.84 mm to 6.86 mm). Further, the second metal layer 220 may be machined from a 6.35 mm stock to a thickness of about 3.886 mm. Other thicknesses are possible as well.

In some embodiments, the joining of the two metal layers 200, 220 may result in an air gap or other discontinuity between mating surfaces of the two layers. In such embodiments, this gap or continuity should be proximate to (or perhaps as close as possible to) a center of the length of the antenna apparatus and may have a size of about 0.05 mm or smaller.

Figure 2D:
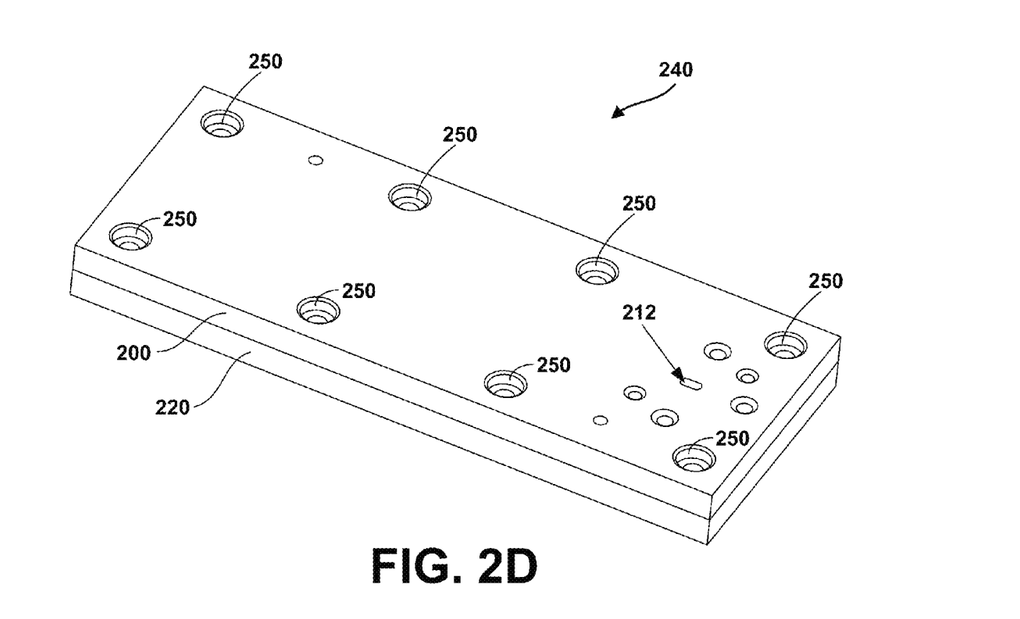
FIG. 2D illustrates an assembled views of an example antenna, in accordance with an example embodiment.

FIG. 2D illustrates another assembled view of the example antenna 240. As shown, the first metal layer 200 may include a plurality of holes 250 (through-holes and/or blind-holes) configured to house alignment pins, screws, and the like. One or more of the plurality of holes 250 may be aligned with the holes 242 of the second metal layer 220. Further, FIG. 2D shows the input port 212, where the antenna 240 may receive electromagnetic waves into the one or more waveguide channels 202.

Figure 2E:
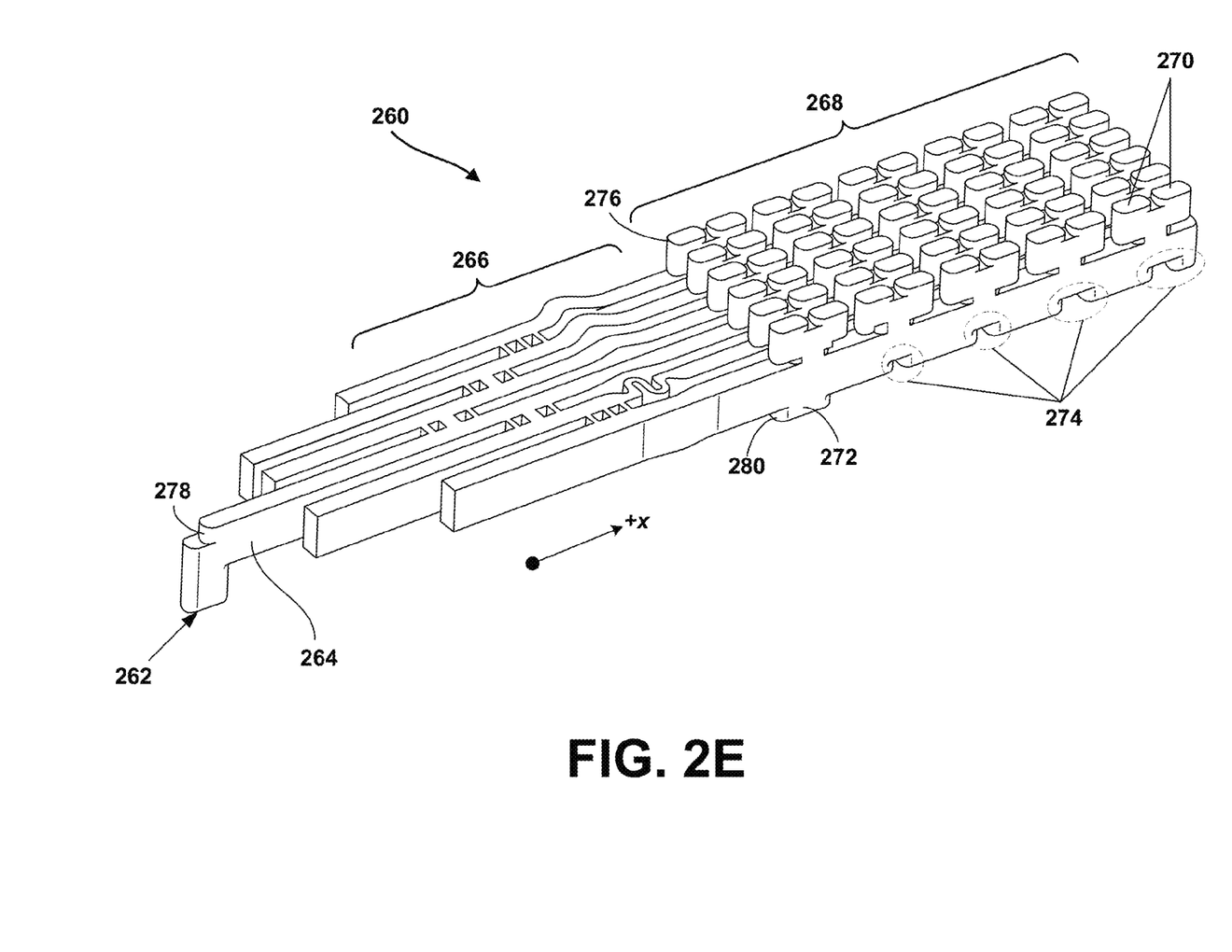
FIG. 2E illustrates conceptual waveguide channels formed inside an assembled example antenna, in accordance with an example embodiment.

FIG. 2E illustrates conceptual waveguide channels 260 formed inside an assembled example antenna. More particularly, the waveguide channels 260 take the form of the waveguide channels 202 of FIGS. 2A and 2B. For instance, the channels 260 include an input port 262 to the input waveguide channel 264. The channels 260 also include wave-dividing channels 266 and a plurality of radiating doublets 268 (i.e., a DOEWG array). As described above, when electromagnetic waves enter the channels 260 at the input port 262, they may travel in the +x direction through the input waveguide channel 264 and be divided into portions by the wave-dividing channels 266 (e.g., by the power dividers). Those portions of electromagnetic waves may then travel in the +x direction to respective radiating doublets 268, where sub-portions of those portions are radiated out each DOEWG through pairs of output ports, such as pair 270, for instance.

In a particular wave-radiating channel, a portion of electromagnetic waves may first be propagated through a first DOEWG with a recessed wave-directing member 272 (i.e., an inverse step, or "well"), as discussed above. This recessed wave-directing member 272 may be configured to radiate the smallest fraction of energy of all the members of the DOEWGs of the particular wave-radiating channel. In some examples, subsequent wave-directing members 274 may be formed (e.g., protruded, rather than recessed) such that each subsequent DOEWG can radiate a higher fraction of the remaining energy than the DOEWG that came before it. Phrased another way, each wave-directing member 272, 274 may generally be formed as a "step cut" into a horizontal (+x direction) channel (i.e., a wave-radiating channel, or the "first end" of an "elongated segment" as noted above) and used by the antenna to tune the amount of energy that is radiated vs. the amount of energy that is transmitted further down the antenna.

In some embodiments, a given DOEWG may not be able to radiate more than a threshold level of energy and may not be able to radiate less than a threshold level of energy. These thresholds may vary based on the dimensions of the DOEWG components (e.g., the wave-directing member, a horizontal channel, a vertical channel, a bridge between the two output ports, etc.), or may vary based on other factors associated with the antenna.

In some embodiments, the first and second metal layers may be machined such that various sides of the waveguide channels 260 have rounded edges, such as edge 276, 278, and 280, for example.

Figure 3A:
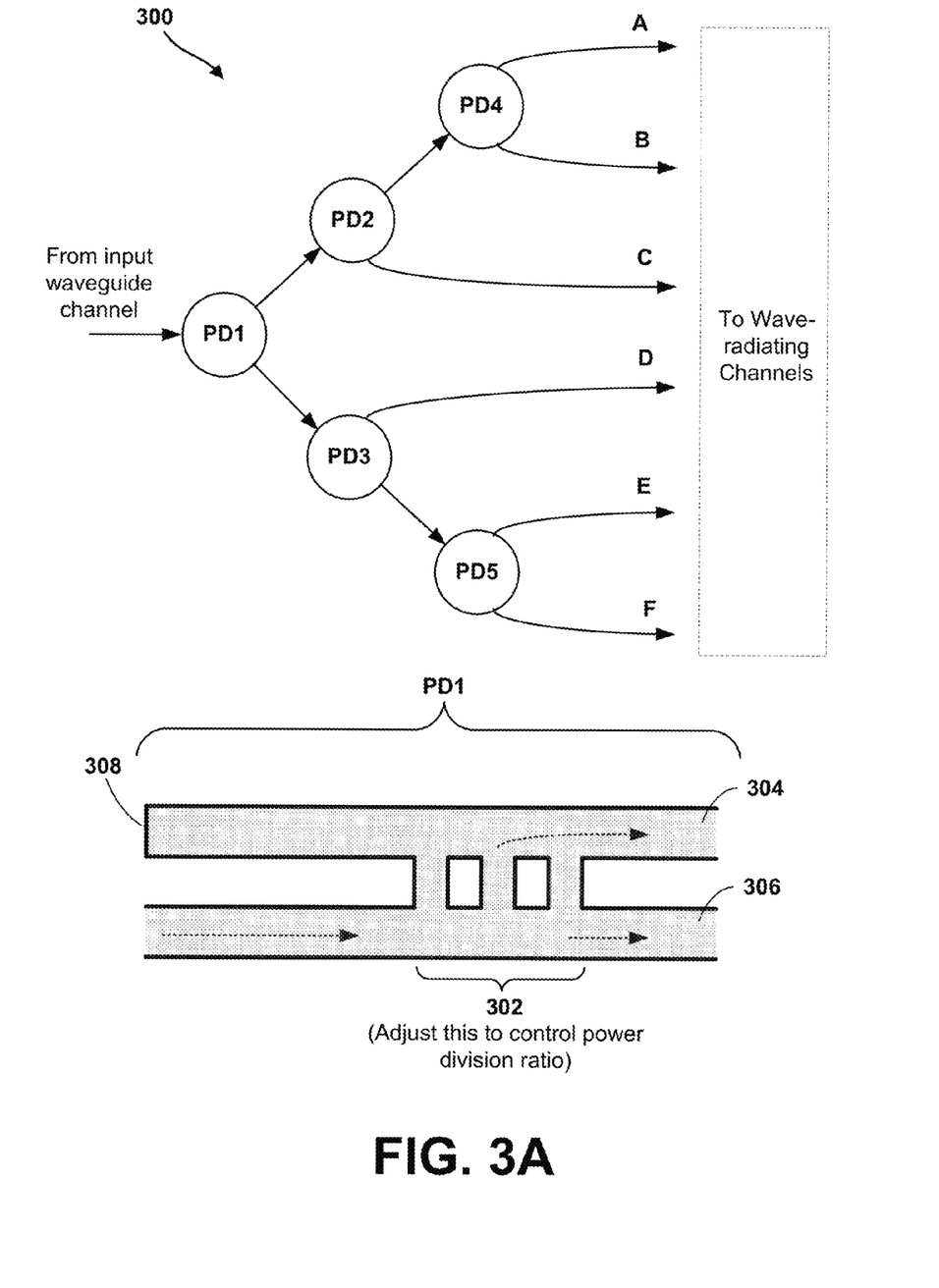
FIG. 3A illustrates a network of wave-dividing channels of an example antenna, in accordance with an example embodiment.
Figure 3B:
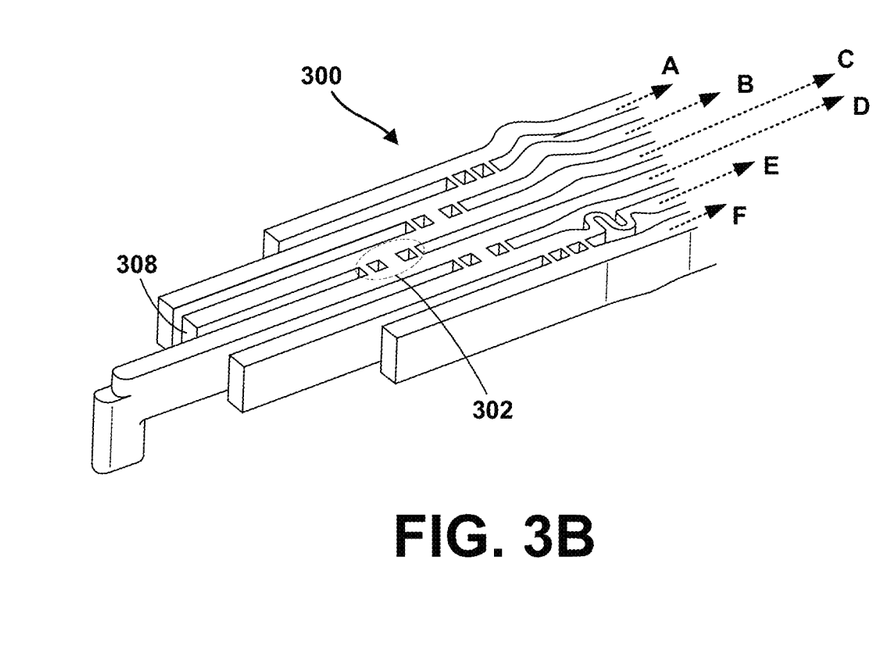
FIG. 3B illustrates an alternate view of the network of wave-dividing channels of FIG. 3A, in accordance with an example embodiment.

FIG. 3A illustrates a network of wave-dividing channels 300 of an example antenna, in accordance with an example embodiment. And FIG. 3B illustrates an alternate view of the network of wave-dividing channels 300, in accordance with an example embodiment.

In some embodiments, the network (e.g., beam-forming network, as noted above) of wave-dividing channels 300 may take the form of a tree of power dividers, as shown in FIG. 3A. Energy may enter the antenna through the input waveguide channel and is divided (i.e., split) into smaller portions of energy at each power divider, such as power divider 302, and may be divided multiple times via subsequent power dividers so that a respective amount of energy is fed into each of the wave-radiating channels (energy A-F, as shown). The amount of energy that is divided at a given power divider may be controlled by a power division ratio (i.e., how much energy goes into one channel 304 versus how much energy goes into another channel 306 after the division). A given power division ratio may be adjusted based on the dimensions of the corresponding power divider. Further, each power divider and associated power division ratio may be designed/calculated in order to achieve a desired "power taper" at the wave-radiating channels. In such a case, the antenna may be designed with a "Taylor window" (e.g., radiation ripples drop off at edges) or other window such that sidelobes of the antenna's far-field radiation pattern may be low. As an example, the power division ratios of the power dividers may be set such that energy portions A, B, C, D, E, and F are approximately 3.2%, 15.1%, 31.7%, 31.7%, 15.1%, 3.2% of the energy, respectively. Other example power divisions are possible as well.

Within examples, a technique for dividing energy between two channels 304, 306 may be to use a structure of channels (i.e., a "four-port branchline coupler) such as that shown at the bottom of FIG. 3A. Such a technique and structure design may include a "terminator" 308 at the end of a channel, as shown in FIGS. 3A and 3B, where several wedges of radio frequency-absorbing material may be located to absorb energy that returns backwards through the channel to that terminator 308.

Figure 4A:
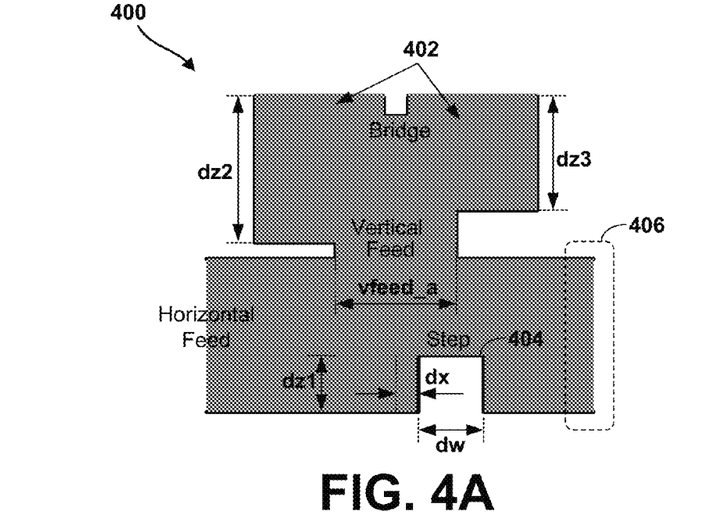
FIG. 4A illustrates an example wave-radiating portion of an example antenna, in accordance with an example embodiment.

FIG. 4A illustrates an example wave-radiating doublet of an example antenna, in accordance with an example embodiment. More specifically, FIG. 4A illustrates a cross-section of an example DOEWG 400. As noted above, a DOEWG 400 may include a horizontal feed (i.e., channel), a vertical feed (i.e. a doublet neck), and a wave-directing member 404. The vertical feed may configured to couple energy from the horizontal feed to two output ports 402, each of which is configured to radiate at least a portion of electromagnetic waves out of the DOEWG 400. In some embodiments, the farthest DOEWG from the input port may include a backstop at location 406. DOEWGs that come before the last DOEWG may simply be open at location 406 and electromagnetic waves may propagate through that location 406 to subsequent DOEWGs. For example, a plurality of DOEWGs may be connected in series where the horizontal feed is common across the plurality of DOEWGs (as shown in FIG. 4C).

In order to tune a DOEWG such as DOEWG 400, the vertical feed width, vfeed_a, and various dimensions of the step 404 (e.g., dw, dx, and dz1) may be tuned to achieve different fractions of radiated energy out the DOEWG 400. The step 404 may also be referred to as a reflecting component as it reflects a portion of the electromagnetic waves that propagate down the horizontal feed into the vertical feed. Further, in some examples, the height dz1 of the reflecting component may be negative, that is may extend below the bottom of the horizontal feed.

In some examples, each output port 402 of the DOEWG 400 may have an associated phase and amplitude. In order to achieved the desired phase and amplitude for each output port 402, various geometry components may be adjusted. As previously discussed, the step (reflecting component) 404 may direct a portion of the electromagnetic wave through the vertical feed. In order to adjust an amplitude associated with each output port 402 of a respective DOEWG 400, a height associated with each output port 402 may be adjusted. Further, and as shown in FIG. 4B, the height associated with each output port 402 could be the height or the the depths of this feed section of output port 402, and not only could be a height or depth adjustment but it could be a multiplicity of these changes or steps or ascending or descending heights or depths in general.

As shown in FIG. 4A, height dz2 and height dz3 may be adjusted to control the amplitude with respect to the two output ports 402. The adjustments to height dz2 and height dz3 may alter the physical dimensions of the doublet neck (e.g. vertical feed of FIG. 4A). The doublet neck may have dimensions based on the height dz2 and height dz3. Thus, as the height dz2 and height dz3 are altered for various doublets, the dimensions of the doublet neck (i.e. the height of at least one side of the doublet neck) may change. In one example, because height dz2 is greater than height dz3, the output port 402 associated with (i.e. located adjacent to) height dz2 may radiate with a greater amplitude than the amplitude of the signal radiated by the output port 402 associated with height dz3.

Figure 4B:
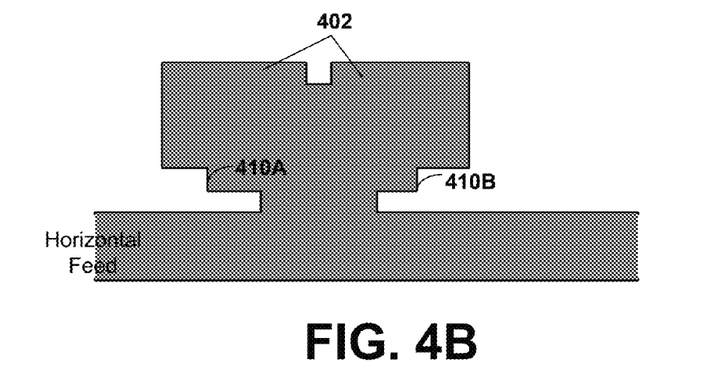
FIG. 4B illustrates an example wave-radiating portion of an example antenna, in accordance with an example embodiment.
Figure 4C:
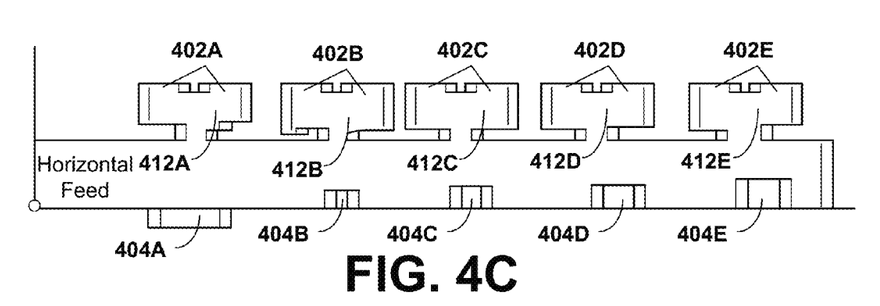
FIG. 4C illustrates an example wave-radiating portion of an example antenna, in accordance with an example embodiment.

Further, in order to adjust the phase associated with each output port 402, a step 410A and 410B may be introduced for each output port 402 (as shown in FIG. 4B). The step 410A and 410B in the height may cause a phase of a signal radiated by the output port 402 associated with the step to change. Thus, by controlling both the height and the step 410A and 410B associated with each output port 402, both the amplitude and the phase of a signal transmitted by the output port 402 may be controlled. In various examples, the step 410A and 410B may take various forms, such as a combination of up-steps and down-steps. Additionally, the number of steps 410A and 410B may be increased or decreased to control the phase.

FIG. 4C presents one example of ten output ports (corresponding to element 402 of FIG. 4A) configured as five radiating doublets 412A-412E. The five radiating doublets 412A-412E are fed electromagnetic waves (e.g. electromagnetic signals) via a horizontal feed that is common to all five doublets. Each doublet 412A-412E may have an associated reflecting component 404A-404E in the horizontal feed configured to reflect a portion of the electromagnetic waves through a vertical feed of the respective doublet. Further, as shown in FIG. 4C, each output port 402A-402E of the respective doublet may have an associated height and step configured to control the amplitude in phase of signals radiated by the respective output port. Therefore, a taper profile of amplitude and phase may be created across the plurality of output ports.

In order to tune the taper profile, the height (or depth) of the reflecting component, the width of the reflecting component, the location of the reflecting component (i.e. an offset of the reflecting component), a height associated with each output port, and a stop associated with each output port may be adjusted. The adjustments may be performed iteratively on a computer in order to achieve the desired taper profile. By controlling the dimensional parameters, such as the height, depth, step, number of steps, etc., associated with each output port, a fine tune control of the taper profile may be achieved. In one specific example, the dimensions of each reflecting component maybe set to control a percentage of the electromagnetic waves coupled through each vertical feed. Once the percentage of the electromagnetic waves coupled through each vertical feed is set, the height associated with each output port may be set to control the amplitude radiated by each output port. Once the amplitude is set, the step may be adjusted to control a phase radiated by each output port.

It should be understood that other shapes and dimensions of the waveguide channels, portions of the waveguide channels, sides of the waveguide channels, wave-directing members, and the like are possible as well. In some embodiments, a rectangular shape of waveguide channels may be highly convenient to manufacture, though other methods known or not yet known may be implemented to manufacture waveguide channels with equal or even greater convenience.

It should be understood that arrangements described herein are for purposes of example only. As such, those skilled in the art will appreciate that other arrangements and other elements (e.g. machines, apparatuses, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the scope being indicated by the following claims.

What is claimed is:

1. A radar system comprising:
   a plurality of radiating elements configured to radiate electromagnetic energy, wherein each radiating element of the plurality of radiating elements has an associated amplitude and phase, wherein the plurality of radiating elements is located on a top surface of a first layer; and
   a waveguide configured to propagate an electromagnetic signal from a waveguide feed to the plurality of radiating elements, wherein the waveguide feed is located on a bottom surface of a second layer, and wherein a portion of the waveguide is located in the first layer and portion of the waveguide is located in the second layer and a coupling of the first layer to the second layer forms the waveguide,
   wherein the plurality of radiating elements are arranged in a plurality of doublets, wherein each doublet comprises two radiating elements and is coupled to the waveguide via a respective doublet neck located in the first layer, wherein at least one doublet in the plurality of doublets is coupled to the waveguide via a doublet neck that has a first height proximate a first radiating element in the at least one doublet and a second height proximate a second radiating element in the at least one doublet in which the first height is different from the second height, and wherein the at least one doublet has a corresponding reflecting component in the waveguide, wherein the reflecting component is located wholly in the second layer.

2. The radar system according to claim 1, wherein the amplitude of the plurality of radiating elements is determined based on a taper profile.

3. The radar system according to claim 1, wherein the reflecting component comprises a protrusion into the waveguide.

4. The radar system according to claim 1, wherein the plurality of doublets includes at least five doublets.

5. The radar system according to claim 1, wherein at least one doublet in the plurality of doublets comprises a phase adjustment section associated with one of the radiating elements of the at least one doublet, wherein the phase adjustment section comprises a step in the height of the doublet neck associated with the radiating element.

6. The radar system according to claim 1, wherein each doublet of the plurality of doublets has a corresponding reflecting component in the waveguide.

7. The radar system according to claim 1, wherein the waveguide antenna is configured to operate at 77 Gigahertz (GHz).

8. A method of radiating a radar signal comprising:
   propagating electromagnetic energy via a waveguide from a waveguide feed to the plurality of radiating elements, wherein the waveguide feed is located on a bottom surface of a second layer, and wherein a portion of the waveguide is located in a first layer and portion of the waveguide is located in the second layer and a coupling of the first layer to the second layer forms the waveguide;
   coupling at least a portion of the electromagnetic energy from the waveguide to each one of a plurality of doublets, wherein each doublet comprises two radiating elements and is coupled to the waveguide via a respective doublet neck located in the first layer, wherein at least one doublet in the plurality of doublets is coupled to the waveguide via a doublet neck that has a first height proximate a first radiating element in the at least one doublet and a second height proximate a second radiating element in the at least one doublet in which the first height is different from the second height, and wherein the at least one doublet has a corresponding reflecting component in the waveguide, wherein each doublet is located on a top surface of a first layer and wherein the reflecting component is located wholly in the second layer; and
   radiating at least a portion of the coupled electromagnetic energy via each radiating element in the plurality of doublets, wherein each radiating element has an associated amplitude and phase.

9. The method according to claim 8, wherein the amplitude of the plurality of radiating elements is determined based on a taper profile.

10. The method according to claim 8, wherein the reflecting component comprises a protrusion into the waveguide.

11. The method according to claim 8, wherein the plurality of doublets includes at least five doublets.

12. The method according to claim 8, wherein at least one doublet in the plurality of doublets comprises a phase adjustment section associated with one of the radiating elements of the at least one doublet, wherein the phase adjustment section comprises a step in the height of the doublet neck associated with the radiating element.

13. The method according to claim 8, wherein each doublet of the plurality of doublets has a corresponding reflecting component in the waveguide.

14. A radiating structure comprising:
   a feed layer configured to receive electromagnetic waves into a waveguide wherein the feed layer comprises at least one reflecting component located wholly in the feed layer;
   a waveguide configured to propagate electromagnetic energy, wherein the wherein a portion of the waveguide is located in the feed layer and portion of the waveguide is located in a radiating layer and a coupling of the feed layer to the waveguide layer forms the waveguide;
   the radiating layer coupled to the feed layer, wherein:
      the radiating layer comprises a linear array of radiating elements, wherein the array comprises:
         a plurality of radiating elements configured to radiate electromagnetic energy, wherein each radiating element of the plurality of radiating elements has an associated amplitude and phase; and wherein the plurality of radiating elements are arranged in a plurality of doublets, wherein each doublet comprises two radiating elements and is coupled to the waveguide via a respective doublet neck, wherein at least one doublet in the plurality of doublets is coupled to the waveguide via a doublet neck that has a first height proximate a first radiating element in the at least one doublet and a second height proximate a second radiating element in the at least one doublet in which the first height is different from the second height, and wherein the at least one doublet has a corresponding one of the at least one reflecting component in the waveguide.

* * * * *